United States Patent
Li (10) Patent No.: US 12,052,665 B2
(45) Date of Patent: Jul. 30, 2024

(54) METHODS AND APPARATUSES FOR USING POWER-SAVING SIGNAL PATTERN, DEVICE AND SYSTEM

(71) Applicant: BEIJING XIAOMI MOBILE SOFTWARE CO., LTD., Beijing (CN)

(72) Inventor: Yanhua Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 386 days.

(21) Appl. No.: 17/423,464

(22) PCT Filed: Jan. 22, 2019

(86) PCT No.: PCT/CN2019/072702
§ 371 (c)(1),
(2) Date: Jul. 15, 2021

(87) PCT Pub. No.: WO2020/150903
PCT Pub. Date: Jul. 30, 2020

(65) Prior Publication Data
US 2022/0078715 A1 Mar. 10, 2022

(51) Int. Cl.
*H04W 52/02* (2009.01)
*H04W 24/10* (2009.01)
*H04W 72/1268* (2023.01)
*H04W 72/1273* (2023.01)
*H04W 72/23* (2023.01)

(52) U.S. Cl.
CPC ....... *H04W 52/0235* (2013.01); *H04W 24/10* (2013.01); *H04W 72/1268* (2013.01); *H04W 72/1273* (2013.01); *H04W 72/23* (2023.01)

(58) Field of Classification Search
CPC ............ H04W 52/0235; H04W 24/10; H04W 72/1268; H04W 72/1273; H04W 72/23; H04W 72/20; H04W 4/06; H04W 28/02; H04W 36/00; H04W 52/02; H04W 28/0278; H04W 36/0083; H04W 52/0229; Y02D 30/70
See application file for complete search history.

(56) References Cited

U.S. PATENT DOCUMENTS

| | | | |
|---|---|---|---|
| 9,467,357 B2* | 10/2016 | Kim ................. | H04W 52/0206 |
| 11,606,750 B2* | 3/2023 | Ahn ................. | H04W 52/0229 |
| 2022/0078715 A1* | 3/2022 | Li ......................... | H04W 52/02 |
| 2022/0286964 A1* | 9/2022 | Peng ................ | H04W 52/0229 |

FOREIGN PATENT DOCUMENTS

CN 109219116 A 1/2019

OTHER PUBLICATIONS

PCT/2019/072702 English translation fo the International Search Report dated Sep. 27, 2019, 2 pages.

* cited by examiner

*Primary Examiner* — Julio R Perez
(74) *Attorney, Agent, or Firm* — Cozen O'Connor (57) ABSTRACT

A method for using a power saving signal pattern includes. a terminal device obtaining a trigger condition. The trigger condition includes a condition to stop using a power saving signal pattern. The terminal device determines whether the trigger condition is satisfied. The terminal device stops using the power saving signal pattern in response to the trigger condition is satisfied.

17 Claims, 5 Drawing Sheets

METHODS AND APPARATUSES FOR USING POWER-SAVING SIGNAL PATTERN, DEVICE AND SYSTEM

CROSS-REFERENCE TO RELATED APPLICATION(S)

This application is a national stage of International Application No. PCT/CN2019/072702, filed on Jan. 22, 2019, the disclosure of which is incorporated herein by reference in its entirety.

TECHNICAL FIELD

The disclosure relates to the field of communications, and in particular to, methods and apparatuses for using a power saving signal pattern, and a device and a system.

BACKGROUND

In a R15 version of the 3GPP (Third Generation Partnership Project), WUS (Wake Up Signaling) and GTS (Go To Sleep) are introduced in the NB-IoT (Narrow Band Internet of Things) and eMTC (enhanced Machine Type Communication) projects.

The WUS is a low power consumption detection signal, generally before a time for performing PDCCH (Physical Downlink Control Channel) monitoring. If a UE (User Equipment) detects that there is a WUS, it means that the PDCCH needs to be monitored. If the UE detects that there is no WUS, the monitoring of the PDCCH is skipped. The WUS also appears in a certain period, and the UE is wakened up to monitor the WUS periodically. The GTS explicitly allows the UE to sleep for a period of time. The WUS pattern and the GTS pattern are collectively referred to as power saving signal pattern.

SUMMARY

A method for using a power saving signal pattern is provided. In one embodiment, the method includes: obtaining a trigger condition by a terminal device, the trigger condition including a condition to stop using a power saving signal pattern; determining whether the trigger condition is met by the terminal device; and stopping using the power saving signal pattern by the terminal device in response to that the trigger condition is met.

Another method for using a power saving signal pattern is provided. In one embodiment, the method includes: sending a trigger condition by an access network device to a terminal device, the trigger condition being configured to instruct the terminal device to stop using the power saving signal pattern.

A terminal device is provided. In one embodiment, the terminal device includes: a processor, a transceiver connected to the processor, and a memory for storing instructions executable by the processor. The processor is configured to load and execute the instructions to implement a method for using a power saving signal pattern described above.

It should be understood that the above general description and the following detailed description are only exemplary and explanatory, and cannot limit the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

The communicating system and business scenarios described in embodiments of the disclosure are intended to more clearly illustrate the technical solution of embodiments of the disclosure, and do not constitute a limitation to the technical solution of embodiments of the disclosure. Those skilled in the art would know that with evolution of the communicating system and emergence of new business scenarios, the technical solution of embodiments of the disclosure are equally applicable to similar technical problems.

Figure 1:
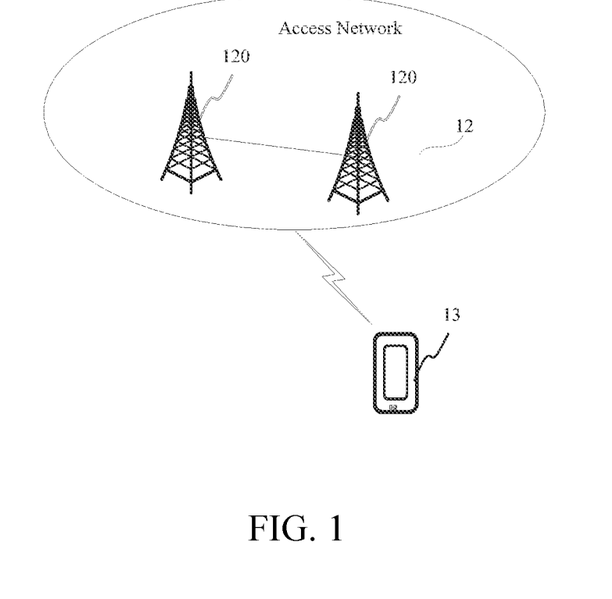
FIG. 1 is a schematic diagram of a communicating system according to the embodiments of the disclosure.

In an optional embodiment, embodiments of the disclosure may be applied to a communicating system supporting IoT (Internet of Things) and eMTC (enhanced Machine Type Communication). The communicating system may include an access network 12 and a terminal device 13.

The access network 12 includes multiple access network devices 120. The access network device 120 communicates with a core network device 110 through a certain interface technology, such as an S1 interface in an LTE (long term evolution) system or an NG interface in a 5G (fifth generation) NR (New Radio) system. The access network device 120 may be a base station. The base station refers to a device deployed in an access network to provide a wireless communication function for the terminal device. The base station may include various forms of macro base stations, micro base stations, relay stations, and access points. In systems using different radio access technologies, devices with functions like a base station function may have different names. For example, in the LTE system, the names of devices may be eNodeB or eNB; while in the 5G NR system, the names of devices may be gNodeB or gNB. With the evolution of communication technologies, description of the names of the "base station" is changing. For convenience, in embodiments of the disclosure, the above devices for providing the wireless communication function for the terminal device are all referred to as "access network device".

The terminal device 13 may include various handheld devices, vehicle-mounted devices, wearable devices, computing devices with wireless communication functions or other processing devices connected to wireless modems, as well as various forms of UEs (user equipment), MSs (mobile stations), and terminal devices. For ease of description, the devices mentioned above are all referred to as "terminal device". The access network device 120 and the terminal device 13 communicate with each other through a certain air interface technology, such as a Uu interface.

FIG. 1 is a schematic diagram illustrating a communicating system of an application scenario according to embodiments of the disclosure. In embodiments of the disclosure, a method for using a power saving signal pattern is provided for different types of service monitoring requirements, to solve a problem that the power saving signal pattern will increase a scheduling time delay (latency) of the UE and cannot meet a requirement on time delay of a certain type of services.

In the disclosure, the base station configures the UE with trigger condition for not using the power saving signal pattern and failure condition, to realize switching of different monitoring modes. For example, a monitoring mode based on the power saving signal pattern is enabled in scenarios having high requirements on the power consumption, while another monitoring mode based on a non-power-saving signal pattern is enabled by switching the monitoring modes in scenarios having high requirements on the time delay.

Figure 2:
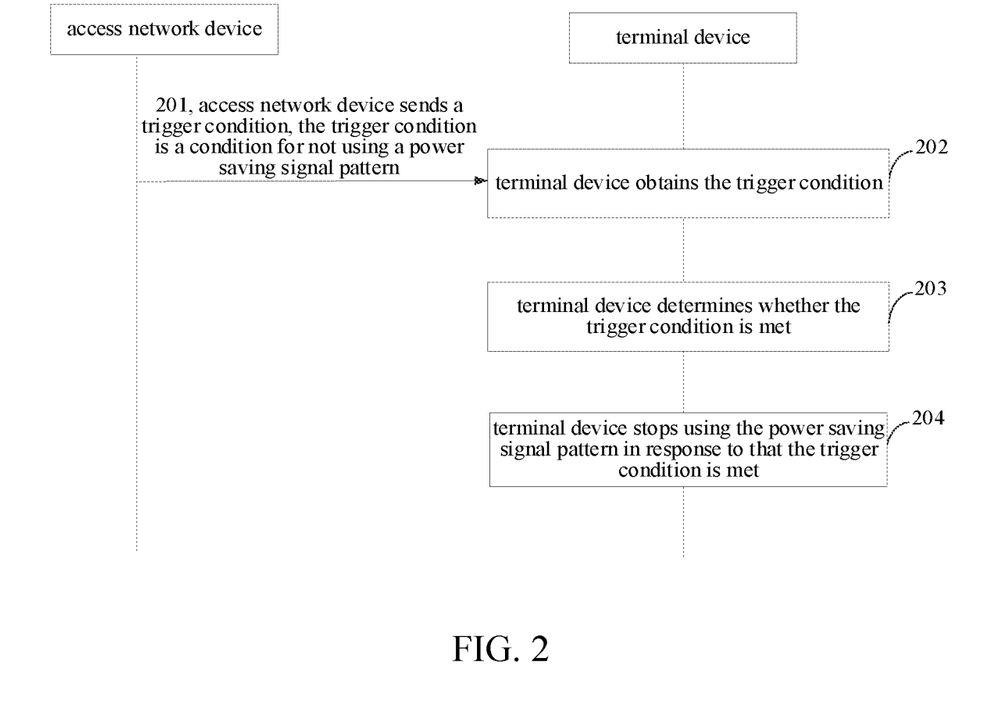
FIG. 2 is a flowchart of a method for using a power saving signal pattern according to embodiments of the disclosure.

FIG. 2 is a flowchart illustrating a method for using a power saving signal pattern according to embodiments of the disclosure. The method may be applied to the communicating system illustrated in FIG. 1. The method may include the following.

In step 201, an access network device sends a trigger condition to a terminal device.

Optionally, the access network device may send the trigger condition to the terminal device in a way of broadcasting a message or through a dedicated signaling.

In step 202, the terminal device obtains the trigger condition.

Correspondingly, the terminal device receives the trigger condition sent by the access network device through a downlink channel.

In step 203, the terminal device determines whether the trigger condition is met.

Optionally, the trigger condition includes a condition for stopping using the power saving signal pattern.

In step 204, the terminal device determines whether the trigger condition is met.

Optionally, the terminal device determines whether its state meets the trigger condition.

The trigger condition refers to a condition for instructing the terminal device to stop using the power saving signal pattern. The trigger condition is used to indicate that there is a service having a high requirement on the time delay currently. The service having the high requirement on the time delay refers to that the requirement on the time delay of the service is higher than a preset condition, such as ULLC (Ultra Reliable Low Latency Communication).

In step 205, the terminal device stops using the power saving signal pattern in response to that the trigger condition is met.

In conclusion, with the method of embodiments of the disclosure, in a system that introduces the power saving signal pattern, by setting the trigger signal between the terminal and the access network device or in the terminal device itself, the terminal device selects the monitoring mode between a triggered PDCCH (Physical Downlink Control Channel) monitoring mode that is triggered based on the power saving signal pattern and another monitoring mode that is not triggered based on the power saving signal pattern. On the one hand, it ensures that the terminal device can operate with low power consumption. On the other hand, in response to that there is a requirement on the time delay, the monitoring mode can change and be switched to another monitoring mode that is not triggered based on the power saving signal pattern, to meet the requirement of the low time delay. The disclosure not only ensures the operation mode of the low power consumption, but also meets the scenarios having the requirement of the low time delay, by introducing the trigger signal to switch between the monitoring modes.

Based on embodiments related to FIG. 2, two configuration methods can be adopted to configure the trigger condition, one is broadcasting a message, and the other one is using a dedicated signaling. The configuration method through broadcasting a message may be seen in FIG. 3 below, and the configuration method through the dedicated signaling may be seen in FIG. 4 below.

Figure 3:
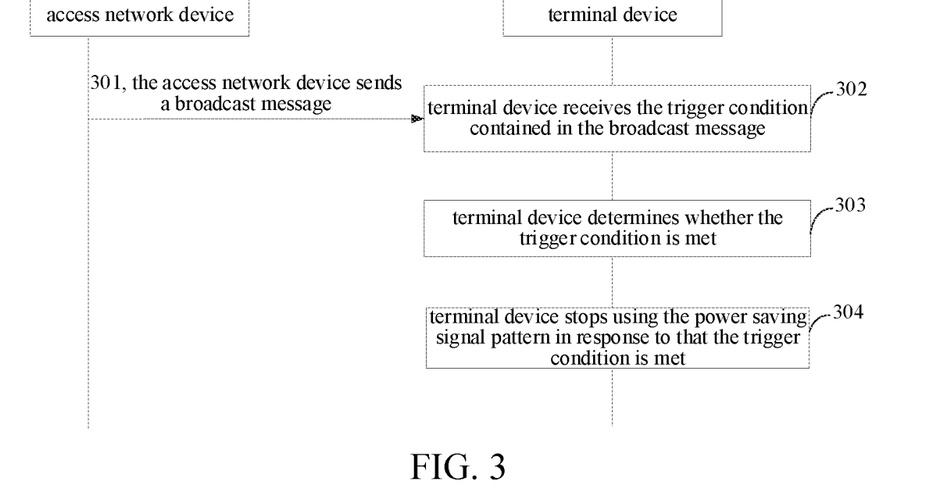
FIG. 3 is a flowchart of a method for using a power saving signal pattern according to embodiments of the disclosure.

FIG. 3 is a flowchart illustrating a method for using a power saving signal pattern according to embodiments of the disclosure. The method at least includes the following.

In step 301, an access network device sends a broadcast message.

The access network device periodically sends the broadcast message to the terminal device through a broadcast channel.

Optionally, the broadcast message includes multiple SIBs (System Information Blocks). Optionally, the trigger condition is carried by a SIB X (such as SIB 4) and is periodically sent within a cell.

The trigger condition refers to a condition for triggering to not use or stop using the power saving signal pattern. The trigger condition is used to indicate that there is a service having a high requirement on the time delay. The service having the high requirement on the time delay means that the requirement on the time delay is higher than a preset condition.

In step 302, the terminal device receives the trigger condition contained in the broadcast message.

Optionally, the trigger condition includes at least one of following conditions:

the terminal device being in a state of waiting for a response message during a process of initiating a RA (routing area) request;

after the terminal device initiating a SR (scheduling request);

after the terminal device initiating a BSR (buffer status report) request of a designated logic channel, or after the terminal device initiating a BSR request of a designated logic channel group;

after the terminal device initiating a measurement report request;

after the terminal device initiating a reestablishment report request;

after a duration of T1 from the terminal device receiving downlink data grant, and downlink decoding being wrong, where the duration of T1 is a time duration from the terminal device receiving the downlink data grant to expecting to retransmit the downlink data grant;

after a duration of T2 from the terminal device receiving uplink data grant, where the duration of T2 is a time duration from the terminal device receiving the uplink data grant to expecting to retransmit or newly transmit the uplink data grant;

after the terminal device detecting that a corresponding grant exists in the power saving signal pattern; or after the terminal device detecting that a corresponding grant exists in a PDCCH).

In step 303, the terminal device determines whether the trigger condition is met.

Optionally, the trigger condition includes a condition for stopping using the power saving signal pattern.

In step 304, the terminal device stops using the power saving signal pattern in response to that the trigger condition is met.

Optionally, in response to that the terminal device determines that the trigger condition contained in the broadcast message is met, the terminal device stops using the power saving signal pattern for monitoring.

The PDCCH is used to send DCI (Downlink Control Information) for the downlink, and the transmitted information includes public control information (e.g., system information and paging information) and user-specific information.

Optionally, the power saving signal pattern includes a WUS (Wake Up Signaling) pattern and a GTS (Go To Sleep) pattern.

The WUS pattern includes a starting time offset and a period.

The GTS pattern includes a sleeping starting time and a sleeping duration.

Optionally, another monitoring mode that is not triggered based on the power saving signal pattern may be PDCCH or DRX (Discontinuous Reception). The WUS may be used together with the DRX. In response to that the WUS fails, the DRX may operate alone.

In conclusion, with the method according to embodiments of the disclosure, in response to that the access network device needs to send the trigger condition to multiple or all terminals within a cell, the broadcast message can be used to configure the trigger condition for the multiple terminals at the same time, thereby reducing the number of sending times for the access network device.

Figure 4:
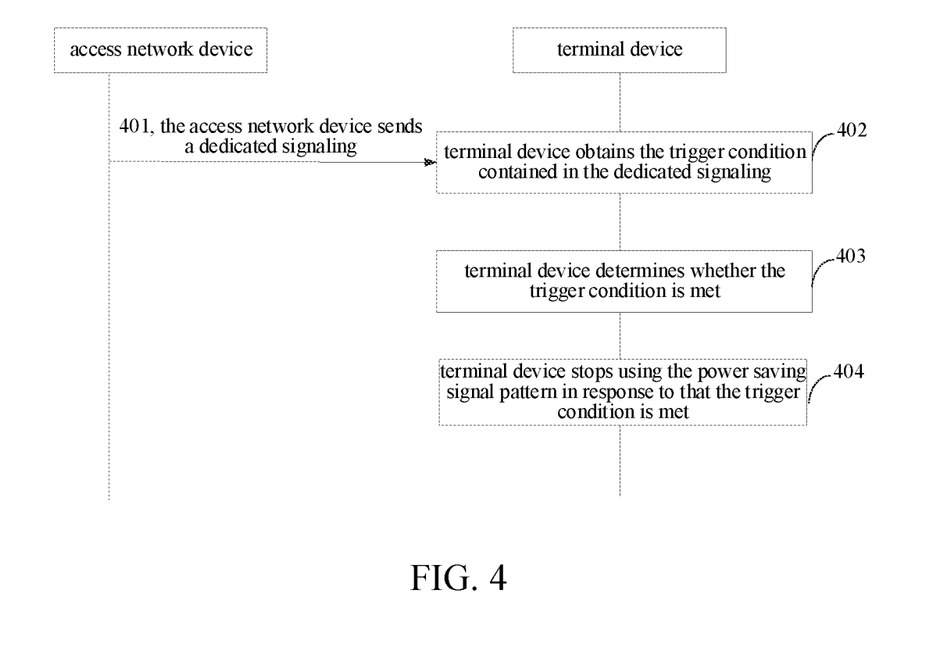
FIG. 4 is a flowchart of a method for using a power saving signal pattern according to embodiments of the disclosure.

In another possible embodiment, the access network device may send the trigger condition in other ways. FIG. 4 is a flowchart illustrating a method for using a power saving signal pattern according to embodiments of the disclosure. The method includes the following.

In step 401, the access network device sends a dedicated signaling to the terminal.

The dedicated signaling refers to instruction information sent by the access network device to a designated terminal. The dedicated signaling includes CCE (Control Channel Element) and C-RNTI (Cell-Radio Network Temporary Identifier) that is used for CRC (Cyclic Redundancy Check) check on the terminal.

The steps 402 to 404 are the same as those mentioned in embodiments related to FIG. 3, and the details are not repeated here.

In conclusion, with the method of embodiments of the disclosure, in response to that the access network device needs to send the trigger condition to one or more designated terminals, the trigger condition may be sent in the way of using the dedicated signaling to avoid affecting other terminal devices within the cell.

In still another possible embodiment, the trigger condition may be pre-determined by a communication protocol. During operation, the terminal device determines in real time whether the pre-configured trigger condition in the terminal device is met based on its own status. If the trigger condition is met, the terminal device stops using the power saving signal pattern and adopts another monitoring mode that is not triggered based on the power saving signal pattern. If the trigger condition is not met, the terminal device does not change the monitoring mode and still uses the triggered PDCCH monitoring that is triggered by the power saving signal pattern.

In conclusion, with the method of embodiments of the disclosure, the trigger condition is predetermined in the terminal device without changing the access network device, and the terminal device selects the monitoring mode by itself by determining in real time whether the trigger condition is met based on its own state. Too much reliance on the access network device may be reduced, and the setting is flexible.

Figure 5:
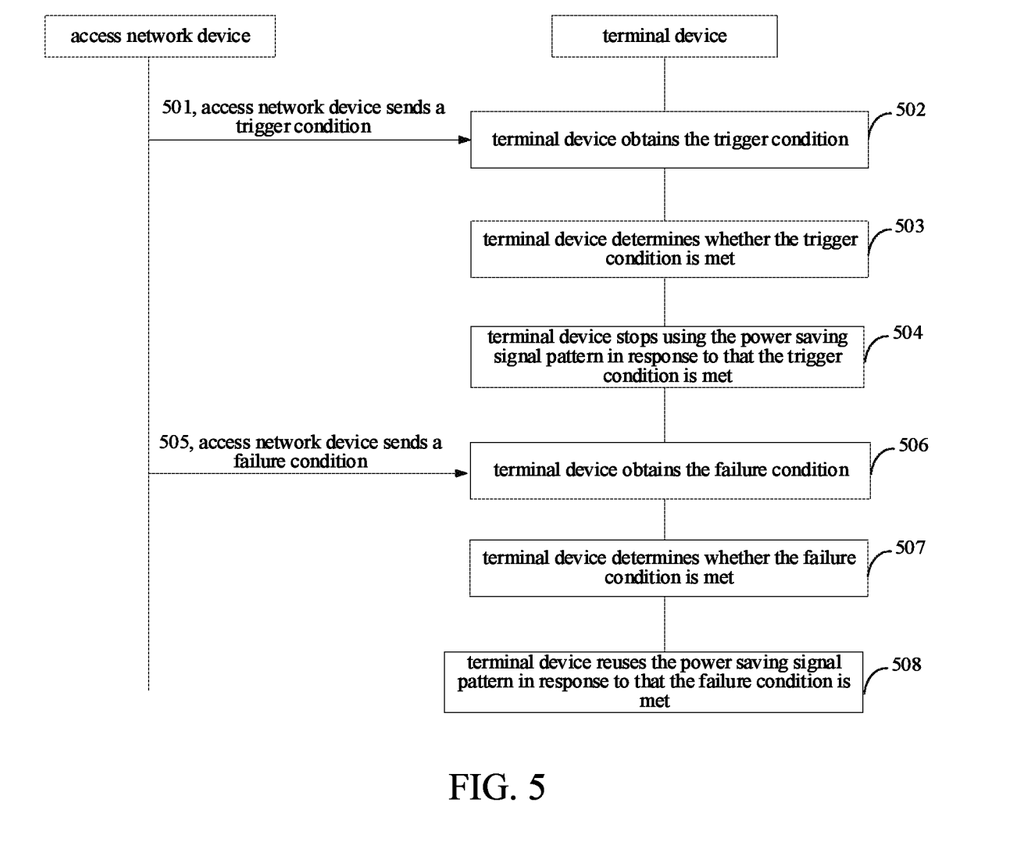
FIG. 5 is a flowchart of a method for using a power saving signal pattern according to embodiments of the disclosure.

In another possible embodiment, in response to that another monitoring mode that is not triggered based on the power saving signal pattern is adopted based on the trigger condition, it is also possible to introduce a failure condition to change the monitoring mode of the terminal device, for example modify another monitoring mode that is not triggered based on the power saving signal pattern to the monitoring mode based on the power saving signal pattern. FIG. 5 is a flowchart illustrating a method for using a power saving signal pattern according to embodiments of the disclosure. The method includes the following.

In step 501, the access network device sends the trigger condition.

Optionally, the trigger condition may be sent to the terminal device in a manner of broadcasting a message or using a dedicated signaling.

In step 502, the terminal device receives the trigger condition.

Optionally, the terminal device obtains the trigger condition sent by the access network device, or reads a predetermined trigger condition.

In step 503, the terminal device determines whether the trigger condition is met.

Optionally, the trigger condition includes at least one condition listed in the descriptions related to the step 302.

In step 504, the terminal device stops using the power saving signal pattern in response to that the trigger condition is met.

In step 505, the access network device sends a failure condition.

The failure condition refers to a condition for instructing the terminal device to reuse the power saving signal pattern. The failure condition is used to indicate that there is no service having a high requirement on the time delay now.

The service having the high requirement on the time delay refers to that the requirement on the time delay of the service is higher than a preset condition. The failure condition is used to configure the terminal device to switch another monitoring mode that is not triggered based on the power saving signal pattern to the monitoring mode based on the power saving signal pattern. There is a correspondence between the failure condition and the trigger condition. The terminal device determines that the trigger condition is met in response to that there is a service having the high requirement on the time delay now, and the terminal device determines that the failure condition is met in response to that there is no service having the high requirement on the time delay or the service having the high requirement on the time delay is finished now.

Optionally, the access network device can send the failure condition in the same way as sending the trigger condition. That is, the failure condition may be sent to the terminal devices within a cell by broadcasting a message, or the failure condition can be sent to a designated terminal device through a dedicated signaling.

In step 506, the terminal device obtains the failure condition.

Optionally, the terminal device may obtain the failure condition from the broadcast message or the dedicated signaling sent by the access network device, or the terminal device can also predetermine the failure condition in itself. The terminal device may determine whether the failure condition is met at any time based on its own state.

In step 507, the terminal device determines whether the failure condition is met.

Optionally, the failure condition includes at least one of following conditions:
- the terminal device setting a timer with a duration of T3 after the trigger condition takes effect, and T3 being expired;
- the terminal device receiving a grant response message, where the grant response message is a response message from the access network device to the SR request from the terminal device;
- the terminal device receiving a reestablishment response message, where the reestablishment response message is a response message from the access network device to a reestablishment request from the terminal device;
- the terminal device receiving a cell handover instruction, where the cell handover instruction is generated by the access network device after receiving the measurement report request from the terminal device;
- the terminal device receiving a msg4 message scrambled by the C-RNTI, where the msg4 message is generated by the access network device after receiving the RA request from the terminal device;
- the terminal device receiving expected uplink data grant information retransmitted or newly transmitted; or the terminal device receiving expected downlink data grant information retransmitted.

In step 508, the terminal device reuses the power saving signal pattern in response to that the failure condition is met.

In conclusion, with the method according to embodiments of the disclosure, the failure condition may be sent in the way of broadcasting a message or through a dedicated signaling. In response to that the access network device needs to send the failure condition to multiple or all terminals within a cell, the failure condition may be sent to the multiple terminals at the same time, to reduce the number of sending times for the access network device. In response to that the access network device needs to send the failure condition to a specific device, the failure condition may be sent through the dedicated signaling, and the access network device may accurately find the terminal device to avoid affecting other devices within the cell.

Figure 6:
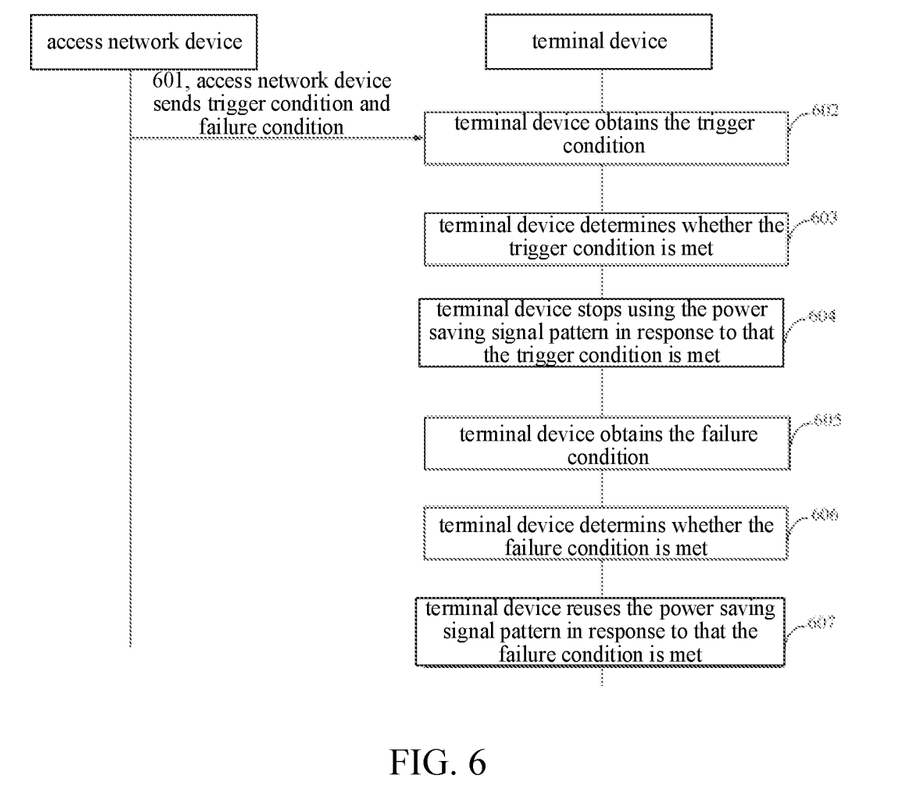
FIG. 6 is a flowchart of a method for using a power saving signal pattern according to embodiments of the disclosure.

In another optional embodiment, the access network device configures both the trigger condition and the failure condition at the same time. As illustrated in FIG. 6, the method includes the following.

In step 601, the access network device sends the trigger condition and the failure condition.

Optionally, the access network device sends the trigger condition and the failure condition to the terminal device at the same time in the way of the broadcast message or the dedicated signaling.

In step 602, the terminal device obtains the trigger condition and the failure condition sent by the access network device.

When the terminal device is in the monitoring mode based on the power saving signal pattern, the terminal device performs the step 602 where the trigger condition is obtained, the step 603 where the terminal device determines whether the trigger condition is met, and the step 604 where the terminal device stops using the power saving signal pattern in response to that the trigger condition is met. When the terminal device is in another monitoring mode that is not triggered by the power saving signal pattern, the terminal device executes the step 605 where the failure condition is obtained, the step 606 where the terminal device determines whether the failure condition is met, and the step 607 where the terminal device reuses a mode of the power saving signal pattern in response to that the failure condition is met.

Optionally, the trigger condition and the failure condition mentioned here are the same as those mentioned in above embodiments, and details are not repeated here.

In conclusion, the access network device sends the trigger condition and the failure condition at the same time, which reduces the number of times that the terminal device is awakened for receiving the trigger condition or the failure condition, reduces unnecessary energy consumption and increases operation duration of the terminal.

In another possible embodiment, the failure condition may be predetermined in the terminal device. The terminal device can predetermine the failure condition in itself without changing the access network device. The terminal device selects the monitoring mode by itself by determining in real time whether the failure condition is met based on its own state. Signaling interaction between the terminal device and the access network device can be reduced.

The following are device embodiments of the disclosure, which may be used to implement the method embodiments of the disclosure. For details that are not disclosed in the device embodiments of the disclosure, refer to the method embodiments of the disclosure.

Figure 7:
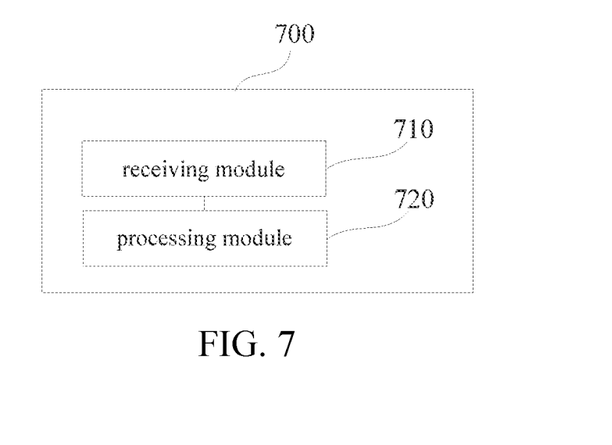
FIG. 7 is a block diagram of an apparatus for using a power saving signal pattern according to embodiments of the disclosure.

FIG. 7 is a block diagram illustrating an apparatus for using a power saving signal pattern according to embodiments of the disclosure. The apparatus has the function of realizing the example of the method of using the power saving signal pattern. The function may be realized by hardware or software. The apparatus 700 may include: a receiving module 710 and a processing module 720.

The receiving module 710 is configured to obtain a trigger condition, the trigger condition includes a condition to stop using the power saving signal pattern.

The processing module 720 is configured to determine whether the trigger condition is met.

The processing module is further configured to stop using the power saving signal pattern in response to that the trigger condition is met.

Optionally, the processing module 720 is configured to stop using the power saving signal pattern in response to that the trigger condition is met.

Optionally, the receiving module 710 is configured to receive a broadcast message sent by an access network device, the broadcast message carrying the trigger condition; or the receiving module 710 is configured to receive a dedicated signaling sent by the access network device, the dedicated signaling carrying the trigger condition; or the processing module 720 is configured to obtain the trigger condition that is pre-determined.

Optionally, the power saving signal pattern includes a Wake Up Signaling, WUS, pattern and a Go To Sleep, GTS, pattern.

The WUS pattern includes a starting time offset and a period.

The GTS pattern includes a sleeping starting time and a sleeping duration.

Optionally, the trigger condition includes at least one of following conditions:
- in a state of waiting for a response message during a process of initiating a routing area, RA, request;
- after initiating a scheduling request, SR;
- after initiating a buffer status report, BSR, request of a designated logic channel, or after initiating a BSR request of a designated logic channel group;
- after initiating a measurement report request;
- after the terminal device initiating a reestablishment report request;
- after a duration of T1 from receiving downlink data grant and downlink decoding being wrong, the duration of T1 being a time duration from receiving the downlink data grant to expecting to retransmit the downlink data grant;
- after a duration of T2 from receiving uplink data grant, the duration of T2 being a time duration from receiving the uplink data grant to expecting to retransmit or newly transmit the uplink data grant;
- after detecting that a corresponding grant exists in the power saving signal pattern; or
- after detecting that a corresponding grant exists in a physical downlink control channel, PDCCH.

Optionally, the receiving module 710 is configured to obtain a failure condition corresponding to the trigger condition.

The processing module 720 is configured to determine whether the failure condition is met.

The processing module is configured to reuse the power saving signal pattern, in response to that the failure condition is met.

Optionally, the failure condition includes at least one of following conditions:
- setting a timer with a duration of T3 after the trigger condition takes effect, and T3 being expired;
- receiving a grant response message, the grant response message being a response message of the access network device to the SR request of the terminal device;
- receiving a reestablishment response message, the reestablishment response message being a response message of the access network device to a reestablishment request of the terminal device;
- receiving a cell handover instruction, the cell handover instruction being generated by the access network device after receiving the measurement report request from the terminal device;
- receiving a msg4 message scrambled by a cell radio network temporary identifier, C-RNTI, the msg4 message being generated by the access network device after receiving the RA request from the terminal device;
- receiving expected uplink data grant information retransmitted or newly transmitted; or
- receiving expected downlink data grant information retransmitted.

Optionally, the receiving module 710 is configured to receive a broadcast message sent by the access network device, the broadcast message carrying the failure condition.

Or, the receiving module 710 is configured to receive a dedicated signaling sent by the access network device, the dedicated signaling carrying the failure condition.

Or, the processing module 720 is configured to obtain the failure condition that is pre-determined.

Figure 8:
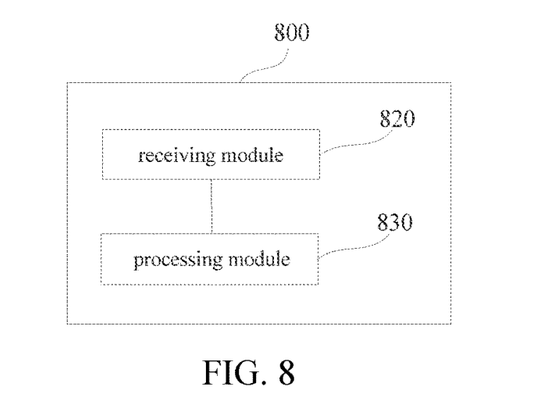
FIG. 8 is a block diagram of an apparatus for using a power saving signal pattern according to embodiments of the disclosure.

In another possible embodiment, an apparatus for using a power saving signal pattern is also disclosed, which is applied to a terminal, the apparatus 800 includes: a sending module 830.

The sending module 830 is configured to send a trigger condition to a terminal device. The trigger condition is configured to instruct the terminal device to stop using the power saving signal pattern.

Optionally, the sending module 830 is configured to send a broadcast message to the terminal device, the broadcast message carrying the trigger condition.

Or, the sending module 830 is configured to send a dedicated signaling to the terminal device, the dedicated signaling carrying the trigger condition.

Optionally, the power saving signal pattern includes: a Wake Up Signaling, WUS, pattern and a Go To Sleep, GTS, pattern.

The WUS pattern includes a starting time offset and a period.

The GTS pattern includes a sleeping starting time and a sleeping duration.

Optionally, the trigger condition includes at least one of following conditions:
- being in a state of waiting for a response message during a process of initiating routing area, RA, request;
- after initiating a scheduling request, SR;
- after initiating a buffer status report, BSR, request of a designated logic channel, or after initiating a BSR request of a designated logic channel group;
- after initiating a measurement report request;
- after the terminal device initiating a reestablishment report request;
- after a duration of T1 from receiving downlink data grant and downlink decoding being wrong, the duration of T1 being a time duration from the terminal device receiving the downlink data grant to expecting to retransmit the downlink data grant;
- after a duration of T2 from receiving uplink data grant, the duration of T2 being a time duration from the terminal device receiving the uplink data grant to expecting to retransmit or newly transmit the uplink data grant;
- after detecting that a corresponding grant exists in the power saving signal pattern; or
- after detecting that a corresponding grant exists in a physical downlink control channel, PDCCH.

Optionally, the receiving module 820 is configured to receive a failure condition corresponding to the trigger condition sent by the access network device to the terminal device, the failure condition is a condition for instructing the terminal device to reuse the power saving signal pattern.

Optionally, the failure condition includes at least one of following conditions:
- setting a timer with a duration of T3 after the trigger condition takes effect, and T3 being expired;
- receiving a grant response message, the grant response message being a response message of the access network device to the SR request of the terminal device;
- the terminal device receiving a reestablishment response message, the reestablishment response message being a response message of the access network device to a reestablishment request of the terminal device;

receiving a cell handover instruction, the cell handover instruction being generated by the access network device after receiving the measurement report request from the terminal device;

receiving a msg4 message scrambled by a cell radio network temporary identifier, C-RNTI, the msg4 message being generated by the access network device after receiving the RA request from the terminal device;

receiving expected uplink data grant information retransmitted and newly transmitted; or receiving expected downlink data grant information retransmitted.

Figure 9:
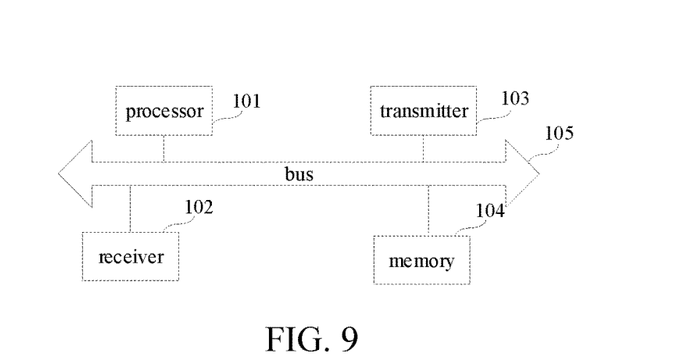
FIG. 9 is a block diagram of a terminal device according to embodiments of the disclosure.

FIG. 9 is a block diagram of a terminal device according to embodiments of the disclosure. The terminal device includes: a processor 101, a receiver 102, a transmitter 103, a memory 104 and a bus 105.

The processor 101 includes one or more processing cores, and the processor 101 executes various functional applications and information processing by running software programs and modules.

The receiver 102 and the transmitter 103 may be implemented as a communication component, and the communication component may be a communication chip.

The memory 104 is connected to the processor 101 through the bus 105.

The memory 104 may be used to store at least one instruction, and the processor 101 is configured to execute the at least one instruction to implement each step executed by the terminal in the above method embodiments.

For example, the memory 104 may be implemented using any type of volatile or non-volatile memory devices, or a combination thereof. The volatile or non-volatile memory devices include but not limited to: a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The exemplary embodiments also provide a non-transitory computer-readable storage medium including instructions, such as the memory 904 including instructions, which may be executed by the processor 920 of the terminal device 900 to complete the above method. For example, the non-transitory computer-readable storage medium may be a ROM, a random access memory (RAM), a CD-ROM, a magnetic tape, a floppy disk, and an optical data storage device.

A non-transitory computer-readable storage medium, when the instructions in the non-transitory computer storage medium are executed by the processor of the terminal, the terminal executes the above method for using the power saving signal pattern.

Figure 10:
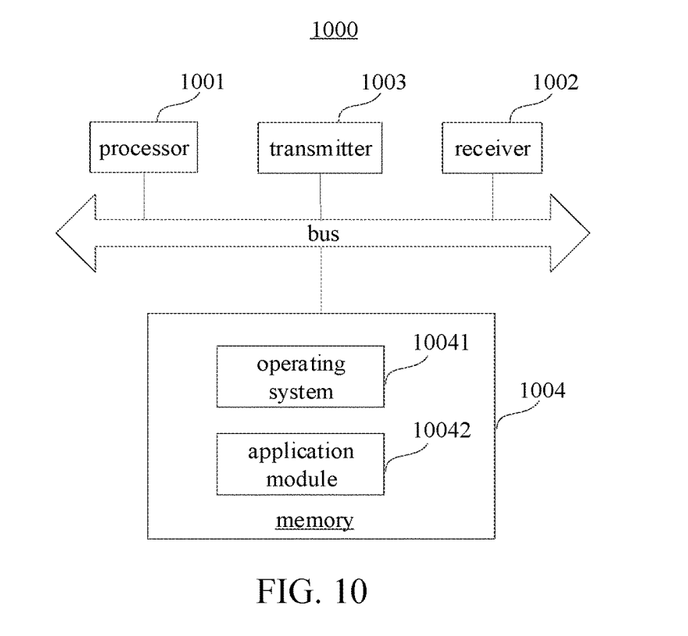
FIG. 10 is a block diagram of an access network device according to embodiments of the disclosure.

FIG. 10 is a block diagram of an access network device 1000 according to embodiments of the disclosure.

The access network device 1000 may include: a processor 1001, a receiver 1002, a transmitter 1003, and a memory 1004. The receiver 1002, the transmitter 1003, and the memory 1004 are respectively connected to the processor 1001 through a bus.

The processor 1001 includes one or more processing cores, and the processor 1001 executes the method executed by the access network device in the transmission configuration method of the embodiments of the disclosure by running software programs and modules. The memory 1004 is configured to store the software programs and modules. In detail, the memory 1004 may store an operating system 10041 and an application module 10042 required by at least one function. The receiver 1002 is configured to receive communication data sent by other devices, and the transmitter 1003 is configured to send the communication data to other devices.

Exemplary embodiments of the disclosure also provide a system for using the power saving signal pattern, the system for using the power saving signal pattern includes a terminal and an access network device.

The terminal illustrated in the embodiments of FIG. 7 provides an apparatus for using a power saving signal pattern.

The access network illustrated in FIG. 8 provides an apparatus for using a power saving signal pattern provided by the embodiments.

Exemplary embodiments of the disclosure also provide a system for using a power saving signal pattern, and the system for using the power saving signal pattern includes a terminal and an access network device.

The terminal is a terminal provided in the embodiment illustrated in FIG. 9.

The access network device is an access network device provided in the embodiment illustrated in FIG. 10.

Exemplary embodiments of the disclosure also provides a non-transitory computer-readable storage medium in which at least one instruction, at least one segment of program, a code set, or an instruction set is stored, the at least one instruction, the at least one segment of program, the code set, or the instruction set is loaded and executed by the processor to implement the steps performed by a first terminal or the access network device in the method for using the power saving signal pattern provided by the above method embodiments.

The technical solution of the embodiments of the disclosure includes the following beneficial effects.

In the communication system that introduces the power saving signal pattern, by setting the trigger signal between the terminal device and the access network device, or in the terminal itself, the terminal selects an appropriate monitoring mode between PDCCH trigger monitoring based on the power saving signal pattern and other monitoring modes that are not triggered based on the power saving signal pattern. On the one hand, it is ensured that the terminal device runs at low power consumption. On the other hand, in certain business scenarios that require delays, the monitoring mode is changed and switched to other monitoring modes that are not triggered by the power saving signal pattern, so as to meet the requirements of low delay. In the disclosure, by introducing the trigger signal to switch the monitoring mode, the operation mode of the low power consumption of the device is ensured, and the requirements of low delay under specific circumstances are met.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for using a power saving signal pattern, comprising:
   obtaining a trigger condition by a terminal device, the trigger condition comprising a condition to stop using a power saving signal pattern and to start physical downlink control channel (PDCCH) monitoring;
   determining whether the trigger condition is met by the terminal device; and
   stopping using the power saving signal pattern and starting the PDCCH monitoring by the terminal device based on the trigger condition being met;
   wherein the trigger condition comprises at least one of:
   the terminal device being in a state of waiting for a response message during a process of initiating a routing area (RA) request;
   when the terminal device initiating a scheduling request (SR); or
   after the terminal device detecting that a corresponding grant exists in a PDCCH.

2. The method of claim 1, wherein obtaining the trigger condition by the terminal device comprises:
   receiving, by the terminal device, a broadcast message sent by an access network device, the broadcast message carrying the trigger condition; or
   receiving, by the terminal device, a dedicated signaling sent by the access network device, the dedicated signaling carrying the trigger condition; or
   obtaining, by the terminal device, the trigger condition that is pre-determined.

3. The method of claim 1, wherein the power saving signal pattern comprises a Wake Up Signaling WUS) pattern and a Go To Sleep (GTS) pattern, the WUS pattern comprising a starting time offset and a period, and the GTS pattern comprising a sleeping starting time and a sleeping duration.

4. The method of claim 1, comprising:
   obtaining, by the terminal device, a failure condition corresponding to the trigger condition;
   determining, by the terminal device, whether the failure condition is met; and
   reusing the power saving signal pattern by the terminal device, based on the failure condition is-being met.

5. The method of claim 4, wherein the failure condition comprises at least one of following conditions:
   the terminal device setting a timer with a duration of T3 after the trigger condition takes effect, and T3 being expired;
   the terminal device receiving a grant response message, the grant response message being a response message of the access network device to a scheduling request (SR) of the terminal device;
   the terminal device receiving a reestablishment response message, the reestablishment response message being a response message of the access network device to a reestablishment request of the terminal device;
   the terminal device receiving a cell handover instruction, the cell handover instruction being generated by the access network device after receiving the measurement report request from the terminal device;
   the terminal device receiving a msg4 message scrambled by a cell radio network temporary identifier (C-RNTI) the msg4 message being generated by the access network device after receiving a routing area (RA) request from the terminal device;
   the terminal device receiving expected uplink data grant information retransmitted or newly transmitted; or
   the terminal device receiving expected downlink data grant information retransmitted.

6. The method of claim 5, wherein obtaining the failure condition corresponding to the trigger condition by the terminal device comprises:
   receiving, by the terminal device, a broadcast message sent by the access network device, the broadcast message carrying the failure condition; or,
   receiving, by the terminal device, a dedicated signaling sent by the access network device, the dedicated signaling carrying the failure condition; or,
   obtaining, by the terminal device, the failure condition that is pre-determined.

7. A method for using a power saving signal pattern, comprising:
   sending a trigger condition by an access network device to a terminal device, the trigger condition being configured to instruct the terminal device to stop using the power saving signal pattern and to start physical downlink control channel (PDCCH) monitoring;
   wherein the trigger condition comprises at least one of:
   the terminal device being in a state of waiting for a response message during a process of initiating routing area (RA) request;
   when the terminal device initiating a scheduling request (SR); or
   after the terminal device detecting that a corresponding grant exists in a PDCCH.

8. The method of claim 7, wherein sending the trigger condition by the access network device to the terminal device comprises:
   sending, by the access network device, a broadcast message to the terminal device, the broadcast message carrying the trigger condition; or,
   sending, by the access network device, a dedicated signaling to the terminal device, the dedicated signaling carrying the trigger condition.

9. The method of claim 7, wherein the power saving signal pattern comprises: a Wake Up Signaling (WUS) pattern and a Go To Sleep (GTS) pattern, the WUS pattern comprising a starting time offset and a period, and the GTS pattern comprising a sleeping starting time and a sleeping duration.

10. The method of claim 7, comprising:
    sending, by the access network device, a failure condition corresponding to the trigger condition to the terminal device, the failure condition being configured to indicate to the terminal device, a condition to reuse the power saving signal pattern.

11. The method of claim 10, wherein the failure condition comprises at least one of following conditions:
    the terminal device setting a timer with a duration of T3 after the trigger condition takes effect, and T3 being expired;
    the terminal device receiving a grant response message, the grant response message being a response message of the access network device to a scheduling request (SR) of the terminal device;
    the terminal device receiving a reestablishment response message, the reestablishment response message being a response message of the access network device to a reestablishment request of the terminal device;
    the terminal device receiving a cell handover instruction, the cell handover instruction being generated by the access network device after receiving the measurement report request from the terminal device;

the terminal device receiving a msg4 message scrambled by a cell radio network temporary identifier (C-RNTI) the msg4 message being generated by the access network device after receiving a routing area (RA) request from the terminal device;

the terminal device receiving expected uplink data grant information retransmitted and newly transmitted; or the terminal device receiving expected downlink data grant information retransmitted.

12. The method of claim 10, wherein sending the failure condition corresponding to the trigger condition by the access network device to the terminal device comprises:

sending, by the access network device, a broadcast message to the terminal device, the broadcast message carrying the failure condition; or, sending, by the access network device, a dedicated signaling to the terminal device, the dedicated signaling carrying the failure condition.

13. A terminal device, comprising:

a processor;

a transceiver connected to the processor; and a memory for storing instructions executable by the processor; wherein the processor is configured to:

obtain a trigger condition, the trigger condition comprising a condition to stop using a power saving signal pattern and to start physical downlink control channel (PDCCH) monitoring;

determine whether the trigger condition is met; and stop using the power saving signal pattern and start the PDCCH monitoring based on the trigger condition being met;

wherein the trigger condition comprises at least one of:

the terminal device being in a state of waiting for a response message during a process of initiating a routing area (RA) request;

when the terminal device initiating a scheduling request (SR); or after the terminal device detecting that a corresponding grant exists in a PDCCH.

14. The terminal device of claim 13, wherein the processor is further configured to:

receive a broadcast message sent by an access network device, the broadcast message carrying the trigger condition; or receive a dedicated signaling sent by the access network device, the dedicated signaling carrying the trigger condition; or obtain the trigger condition that is pre-determined.

15. The terminal device of claim 13, wherein the power saving signal pattern comprises a Wake Up Signaling (WUS) pattern and a Go To Sleep (GTS) pattern, the WUS pattern comprising a starting time offset and a period, and the GTS pattern comprising a sleeping starting time and a sleeping duration.

16. The terminal device of claim 13, wherein the processor is further configured to:

obtain a failure condition corresponding to the trigger condition;

determine whether the failure condition is met; and reuse the power saving signal pattern, based on the failure condition being met.

17. The terminal device of claim 16, wherein the failure condition comprises at least one of following conditions:

the terminal device setting a timer with a duration of T3 after the trigger condition takes effect, and T3 being expired;

the terminal device receiving a grant response message, the grant response message being a response message of the access network device to a scheduling request (SR) of the terminal device;

the terminal device receiving a reestablishment response message, the reestablishment response message being a response message of the access network device to a reestablishment request of the terminal device;

the terminal device receiving a cell handover instruction, the cell handover instruction being generated by the access network device after receiving the measurement report request from the terminal device;

the terminal device receiving a msg4 message scrambled by a cell radio network temporary identifier (C-RNTI) the msg4 message being generated by the access network device after receiving the RA request from the terminal device;

the terminal device receiving expected uplink data grant information retransmitted or newly transmitted; or the terminal device receiving expected downlink data grant information retransmitted.

* * * * *

UNITED STATES PATENT AND TRADEMARK OFFICE
CERTIFICATE OF CORRECTION

PATENT NO. : 12,052,665 B2
APPLICATION NO. : 17/423464
DATED : July 30, 2024
INVENTOR(S) : Yanhua Li It is certified that error appears in the above-identified patent and that said Letters Patent is hereby corrected as shown below:

In the Specification

Column 4, Lines 55-57:
"the terminal device being in a state of waiting for a response message during a process of initiating a RA (routing area) request"
Should read:
--the terminal device being in a state of waiting for a response message during a process of initiating a RA (random access) request;--

Column 9, Lines 12-13:
"in a state of waiting for a response message during a process of initiating a routing area, RA, request;"
Should read:
--in a state of waiting for a response message during a process of initiating a random access, RA, request;--

Column 10, Lines 30-31:
"being in a state of waiting for a response message during a process of initiating routing area, RA, request;"
Should read:
--being in a state of waiting for a response message during a process of initiating a random access, RA, request;--

In the Claims

In Claim 1, Column 13, Lines 14-16:
"the terminal device being in a state of waiting for a response message during a process of initiating a routing area (RA) request"
Should read:

Signed and Sealed this
Twenty-third Day of September, 2025

John A. Squires
*Director of the United States Patent and Trademark Office*

CERTIFICATE OF CORRECTION (continued)
U.S. Pat. No. 12,052,665 B2

--the terminal device being in a state of waiting for a response message during a process of initiating a random access (RA) request;--

In Claim 5, Column 13, Lines 63-65:
"the msg4 message being generated by the access network device after receiving a routing area (RA) request from the terminal device;"
Should read:
--the msg4 message being generated by the access network device after receiving a RA request from the terminal device;--

In Claim 7, Column 14, Lines 24-25:
"response message during a process of initiating routing area (RA) request;"
Should read:
--response message during a process of initiating a random access (RA) request;--

In Claim 11, Column 15, Lines 3-5:
"the msg4 message being generated by the access network device after receiving a routing area (RA) request from the terminal device;"
Should read:
--the msg4 message being generated by the access network device after receiving a RA request from the terminal device--

In Claim 13, Column 15, Lines 35-36:
"response message during a process of initiating a routing area (RA) request;"
Should read:
--response message during a process of initiating a random access (RA) request;--